MINIATURE CAPACITOR AND METHOD OF MAKING THE SAME

Original Filed April 20, 1961

2 Sheets-Sheet 1

HAMMOND E.T. GOWEN
RAYMOND J. GEIB
MORGAN M. HARRIS
INVENTORS

BY Allan M. Shapiro

ATTORNEY

MINIATURE CAPACITOR AND METHOD OF MAKING THE SAME

Original Filed April 20, 1961

2 Sheets-Sheet 2

HAMMOND E. T. GOWEN
RAYMOND J. GEIB
MORGAN M. HARRIS
INVENTORS

BY Allan M. Shapiro

ATTORNEY

United States Patent Office 3,304,475
Patented Feb. 14, 1967

3,304,475

MINIATURE CAPACITOR AND METHOD OF MAKING THE SAME

Hammond E. T. Gowen, Escondido, and Raymond J. Geib and Morgan M. Harris, Los Angeles, Calif., assignors to The Scionics Corporation, Northridge, Calif., a corporation of California Continuation of application Ser. No. 104,461, Apr. 20, 1961. This application June 7, 1965, Ser. No. 466,508
12 Claims. (Cl. 317—261)

This application is a continuation of our application Ser. No. 104,461, filed Apr. 20, 1961, now abandoned.

The present invention relates to miniature multi-plate capacitors and, more specifically, to methods of construction and assembly of modular capacitors and the devices resulting therefrom.

With the advent of miniaturization techniques and the improvement of electronic technology in the direction of obtaining small, lightweight electronic devices, notably transistors, increased emphasis has been placed upon the need for miniaturization of all electronic components. Whereas some electronic devices can be simply reduced in size in accordance with the reduced power requirements associated with transistors, capacitors have not lent themselves to such pure size-reduction techniques for various reasons. Such reasons include considerations of both mechanical and electrical characteristics such as, for example, voltage breakdown, resistance, power dissipation, terminal attachment, and accuracy and reliability of capacitive value not only as to initial rating but also in accordance with variations and ranges of temperature, humidity and various mechanical specifications including shock, vibration and so forth. When dealing with miniature devices and miniaturization techniques (often denoted "micro-miniature" and "micro-miniaturization" because of the relative as well as absolute dimensions and accuracies having ranges in the millionths of an inch measurement field), problems are encountered in the actual fabrication, handling and assembling of the portions and parts of the capacitor due to their extremely small sizes. Hence, it is becoming necessary to utilize different techniques and configurations in order to obtain capacitors differing only in sizes and/or values within given ranges.

Therefore, it is one of the objects of the present invention to provide novel miniature capacitors and a method of making such miniature capacitors in an economical and reliable manner.

Another object of the present invention is the provision of miniature capacitors with modular portions which can be assembled in a versatile variety of configurations and capacitive values, and a method of making such capacitors and modular portions.

A further object of the present invention is to provide novel capacitive modules which can be readily assembled in accordance with selectively predetermined electrical and mechanical characteristics, and a method of making and assembling such modules.

A still further object of the present invention is to provide a method for making miniature capacitors which permits the ease of construction, assembly and handling of each of the modular components as well as the composite modular device.

Additional and related objects of the present invention include the provision of methods for making, and the devices so made, modular capacitors having selectively predetermined characteristics of voltage breakdown, capacitance and size, the latter in both volume and dimensions.

According to the present invention, a capacitor is assembled from a plurality of modules, each module constituting an individual capacitor and comprising a rectanguloid body member of rigid dielectric material with at least two plates of conductive material bonded thereto in the form of layers or films. Each plate covers at least a portion of at least one major surface of the body member so that capacitive effects are attained between various corresponding opposed portions of the plates. The plates of each module have configurations and locations such that a plurality of modules can be stacked together with their plates in registration with each other. In other words, the configuration and location of each plate with respect to its body member are determined partially in accordance with considerations of symmetry to permit stacking of any desired number of modules in accordance with the total capacitive value desired for the assembled capacitor.

In practicing the present invention, the dielectric material chosen for the body member is preferably a ceramic material because of its rigidity and high dielectric constant. Such materials generally have a voltage breakdown level in the range of 200 to 600 volts per mil of thickness between plates. Utilizing a sheet of such material having major dimensions of approximately three inches by one inch or one-quarter inch for ease in handling, construction and later slicing, and an extremely thin thickness of approximately 1 mil to 15 mils, such sheet is coated by any convenient method with a layer or film of electrically conductive material, such as a silver alloy, in intimate bonding contact with the sheet and of extreme thinness ranging, for example, from 0.00001 inch to 0.0005 inch. The conductive film then is grooved down to the body member in certain selected areas to form grooves or channels for separating and insulating portions of the conductive film from each other to form positive and negative plates on sections of the body grooving or channeling may be done in any convenient manner such as, for example, by chemical etching, controlled abrading, or masking prior to the application of the conductive film. These modular capacitive units or sections are complete capacitors in and of themselves. However, in accordance with the primary objectives of the present invention, the capacitive modules are stacked together with adjacent corresponding plates, the composite capacitance being the sum total of the individual modular capacitances. Thus, the total capacitance is directly proportional to the number of plates, provided that the modules are identical in dielectric value, thickness and area. By utilizing relatively large sheets of dielectric material for the body member, as exampled hereinabove, the desired accuracy and uniformity are readily attained. The modular units then are fused and/or bonded into a solid monolithic construction. By mathematically predetermining and/or actual electronic measuring of the total capacitance, the monolith now may be sectioned, by linear measurement, into precise individual and separate capacitors. Although sectioning may be accomplished by any one of several methods, ultrasonic impact grinding is preferred because of its accuracy and the ease with which burrs from the conductive plates may be avoided to prevent bridging the body member and, thus, shorting the unit. Prior to or after sectioning, coatings of solder or other suitable material are applied to respective common plates to provide a sound mechanical and electrical bond as well as facilitate the connection of suitable terminal leads. Of course, such coating also connects the individual capacitances of the modules in electrical parallel. The monolithic capacitor then is impregnated, preferably by a vacuum impregnation process, with a suitable dielectric fluid, varnish or resin, thereby filling any internal voids, including those caused by the presence of the channels or grooves, and completely encompassing the capacitor. Finally, the capacitor is encapsulated or potted into a suitable container, depending upon the environmental condition to be encountered.

As an example of one preferred embodiment of the present invention, each rectanguloid module is provided with two identical J-shaped plates symmetrically disposed on the dielectric body member so that their major arm portions are on the opposite major surfaces of the body member, and their minor arm portions extend around the end surfaces of the body member to partially cover a small portion of the correspondingly opposite major surface. Thus, identical modules may be stacked together in mirror-image alternating relationship so that the major arm portion of one plate of one module is in aligned surface abutment with the major arm portion of a plate of the adjacent module. Any number of modules may be stacked together thusly to form a capacitor having the desired magnitude of total capacitance. A pair of electrical terminal leads may then be connected in common to respective minor arm portions of the plates at the ends of the modules.

Further, the present invention provides a modular construction which permits the assembling and building up of large capacitors having predetermined linear characteristics along at least one dimension of such assembled device so that a plurality of identical or otherwise predetermined characteristic capacitors can be obtained by simply slicing the assembled devices.

Thus, taking the just-described embodiment as an example, each module may have great length along the major surfaces so that the assembled capacitor may be sliced into separate capacitors along lines normal to such major surfaces. Preferably, a number of pairs of terminal leads are connected to the assembled device prior to slicing so that each of the final capacitors has its corresponding pair of leads. Since the assembled capacitor, prior to slicing, is physically as well as capacitively symmetrical, the overall capacitance may be measured and then the slice lines determined in accordance with the linear proportion of the overall capacitance desired for the individual capacitors.

Another embodiment of the present invention is a high voltage capacitor comprising a series-parallel arrangement of plates and capacitors of equal size. Since the average voltage breakdown level of dielectric material varies inversely with the thickness of such material, an effective plurality of dielectric body members is utilized so that the voltage impressed across the end plates will be distributed in equipotential levels over the intervening plates, thus giving a large voltage breakdown capacity in a minimum distance. In other words, a series of plates is arranged in alternating sequence, with portions of the same body member separating such plates, to form a series-capacitive module. Then, a plurality of such modules is stacked in electrical parallel to attain the sum total capacitance desired for the monolithic capacitor. Hence, the parallel stacking of series modular capacitors attains a monolithic capacitor having a minimum volume for the relatively large capacitance and high voltage breakdown level involved.

Another embodiment of the present invention is a high voltage capacitor utilizing a fringe capacitance effect. Two U-shaped plates are formed on the dielectric body member so as to have their end surfaces in special opposition to each other and in respectively coplanar parallel relationship. Bearing in mind that this construction is designed primarily for high voltage applications, and that rigid dielectric materials now known in the art do not have a sufficiently high voltage breakdown characteristic to adequately utilize the fringe effect, the body member is not utilized to separate the paired opposed end surfaces of the plates but, rather, is utilized as a structural material to maintain rigidity of the final device. A non-solid dielectric material such as, for example, Sylgard (a trade name for a silicone gel) is filled into the channels or grooves separating the end surfaces of the plates to prevent voltage breakthrough, such material having a relatively large dielectric constant compared to solid dielectric materials known. Thus, if the dielectric body member is of sufficient thinness, the electrostatic lines of force, which will exist between the opposing end surfaces when a potential is applied, will be forced to extend through the region of the dielectric body member to a greater extent, both in terms of absolute quantity and relative density, compared to the lines of force which will extend through the non-solid dielectric substance having the higher dielectric constant. Thus, in effect, the area of the "plates" of the capacitor will be measured in terms of the cross-sectional area of the body member rather than the surface area of the opposing ends of the physical plates.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
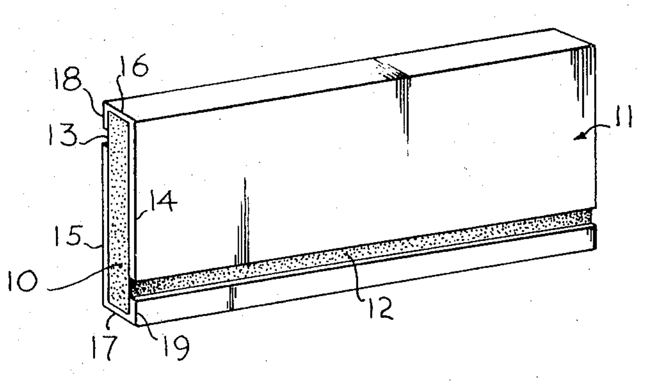
FIGURE 1 is a perspective view of one form of capacitive module in accordance with the present invention.

Referring to FIGURE 1, there is seen a capacitive module which permits the attainment of a capacitor for a capacitor comprising a rectanguloid body member 10 composed of a dielectric material such as, for example, ceramic or plastic, having a coating 11 of electrically conductive material such as, for example, a silver alloy. According to the method of the present invention, the conductive coating 11 is applied by any convenient method over all of the surfaces of the dielectric member and, then, channels or grooves 12 and 13 are cut through such conductive coating to expose the surfaces of the dielectric member and, thus, form at least two spacially and electrically separated plates of electrically conductive material, each of such plates having a desired configuration in accordance with the structural and electrical objectives of the present invention. The particular configuration of the plates illustrated in FIGURE 1 will hereinafter be referred to as a "J" plate configuration because of the visual similarity to such letter of the alphabet. Thus, each of the plates, viewed in cross section, respectively has a long portion 14 and 15, a relatively short portion 16 and 17 at a right angle to the long portion and continuous therewith, and a second short portion 18 and 19 at a right angle to the first short portion and continuous therewith so as to be parallel to the long portion 14 and 15. In the configuration illustrated in FIGURE 1, the major capacitive effect is obtained between the opposed inner faces of the long portions 14 and 15 of the two plates. By attaching electrical terminals or leads (not shown) to each of the plates, a complete capacitor is fabricated from the single module.

Figure 2:
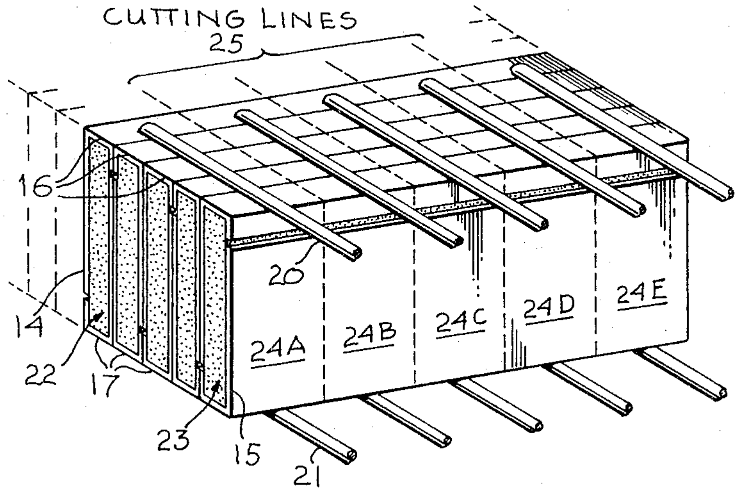
FIGURE 2 is a perspective view, similar in aspect to FIGURE 1, of a capacitor in accordance with the present invention composed of a plurality of the modules illustrated in FIGURE 1.

However, referring to FIGURE 2, it can be seen that a plurality of modular capacitors of the type illustrated in FIGURE 1 may be stocked together for obtaining an increased capacity. The modules, each of which is identical to the others in the embodiment illustrated, are stacked together in alternating directions insofar as the "J" shapes are concerned so that dimensionally corresponding portions of each "J" are in intimate contact with each other. Although a mechanical clamping arrangement can be utilized to assure a strong mechanical bond between such contacting surfaces, it has been found to be preferable to fuse the contacting surfaces of the plates together, as by heating the entire stack in a furnace while maintaining a pressure contact of such surfaces. The resulting structure is mechanically secure and prevents the occurrence of anomalous electrical phenomena in the subsequent utilization of the capacitor. As can be seen, any number of capacitive modules illustrated in FIGURE 1 can be stacked in the manner illustrated in FIGURE 2 in order to attain the capacitance desired. Electrically, each of the modules is in parallel with each of the other modules so that the capacitances are directly additive. Electrical terminal leads, such as paired leads 20 and 21, are each secured to the common end portions 16 and 17, respectively, of the plates of successive modules, as illustrated, or may be secured to the long portions 14 and 15 of the plates of the end modules 22 and 23 as desired. As indicated in FIGURE 2, the composite assembled capacitor illustrated may be sliced into separate capacitors, 24A, 24B, 24C, 24D and 24E along the dash cutting lines 25 shown. In such case, the multiple electrical terminals are secured in their desired locations prior to such slicing operations because of the greater facility with which such securing connections can be made. The slicing lines need not be equally spaced as shown, but may be varied in accordance with the predetermined capacitance desired for the particular capacitive section. Thus, each of the modules of FIGURE 1 having been fabricated with a relatively uniform capacitance along its entire length, the individual capacitances of the sections can be predetermined by purely dimensional sub-division of the composite capacitor of FIGURE 2. The slicing operation is preferably performed by the use of ultrasonic equipment in order to avoid the creation of burrs which might tend to electrically short opposing plates. However, any convenient and appropriate slicing method known in the art may be utilized.

Figure 3:
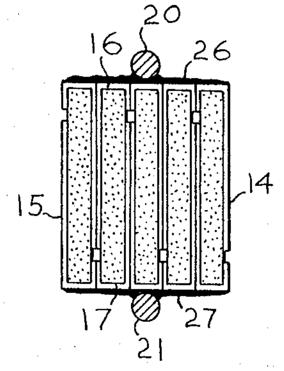
FIGURE 3 is a partially sectioned and elevation view of an assembled capacitor of the type illustrated in FIGURE 2, with the terminals having a different orientation with respect to the modules.

Referring to FIGURE 3, there is seen a preferred means for attaining a strong mechanical bond between the modules as well as a low-resistance electrical contact between the electrical terminals 20 and 21 and each of the modules. Although the electrical terminals 20 and 21 are illustrated as being positioned normal to the plane of the drawing, it should be understood that such terminals may be positioned across the modules, as shown in FIGURE 2, or against the long portions 14 and 15 of the end plates, in which latter case the terminals may be extending upwardly and downwardly in opposite directions from the device or, in the alternative, in the same direction from the device but normal to the plane of the drawing. Coatings 26 and 27 of conductive materials are applied to the opposite surfaces 16 and 17 of the device, such coatings being composed of a silver alloy or any other convenient material. Such coating may be sprayed, brushed or otherwise disposed so as to form a continuous layer with a firm mechanical and electrical bond to the plates. Of course, when utilizing a spray method or any other method which does not have an inherent control as to location, those surfaces or portions of the capacitors shown over which it is not desired to dispose such material must be shielded or masked. Then, the electrical terminals 20 and 21 are soldered to their respective layers 26 and 27. It may be noted that the disposition of the conductive bonding layers 26 and 27 and the securing of the terminals 20 and 21 thereto may be accomplished in one step, as by holding the terminals in position either prior to and/or during the spraying of the bonding layers.

Figure 4:
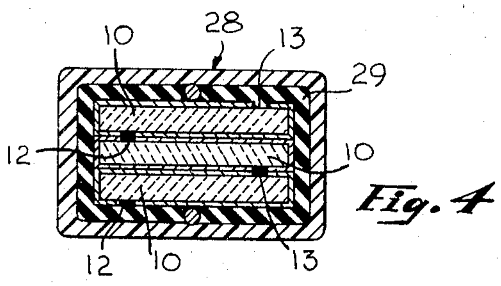
FIGURE 4 is a sectioned end view of a completely impregnated and encapsulated capacitor of assembled modules.

As seen in FIGURE 4, the entire device is preferably encapsulated in a protective substance 28 such as, for example, epoxy resin to protect the capacitor against physical damage as well as to provide electrical shielding for circuit applications. However, it should be noted that, prior to such encapsulation, all of the open channel portions 12 and 13 of the capacitor, including any pores in the dielectric body member 10, are filled with a dielectric material 29 to prevent electrical shorts through such open spaces and to increase the capacity of the device which might be otherwise adversely affected at the grooves or channels 12 and 13. Such dielectric substance 29 may be applied by standard impregnating techniques. Preferably, a material such as Sylgard is applied with a vacuum impregnation technique, since Sylgard has both an extremely high dielectric constant and also a low viscosity so as to have a self-healing characteristic.

Figures 5, 6, 7:
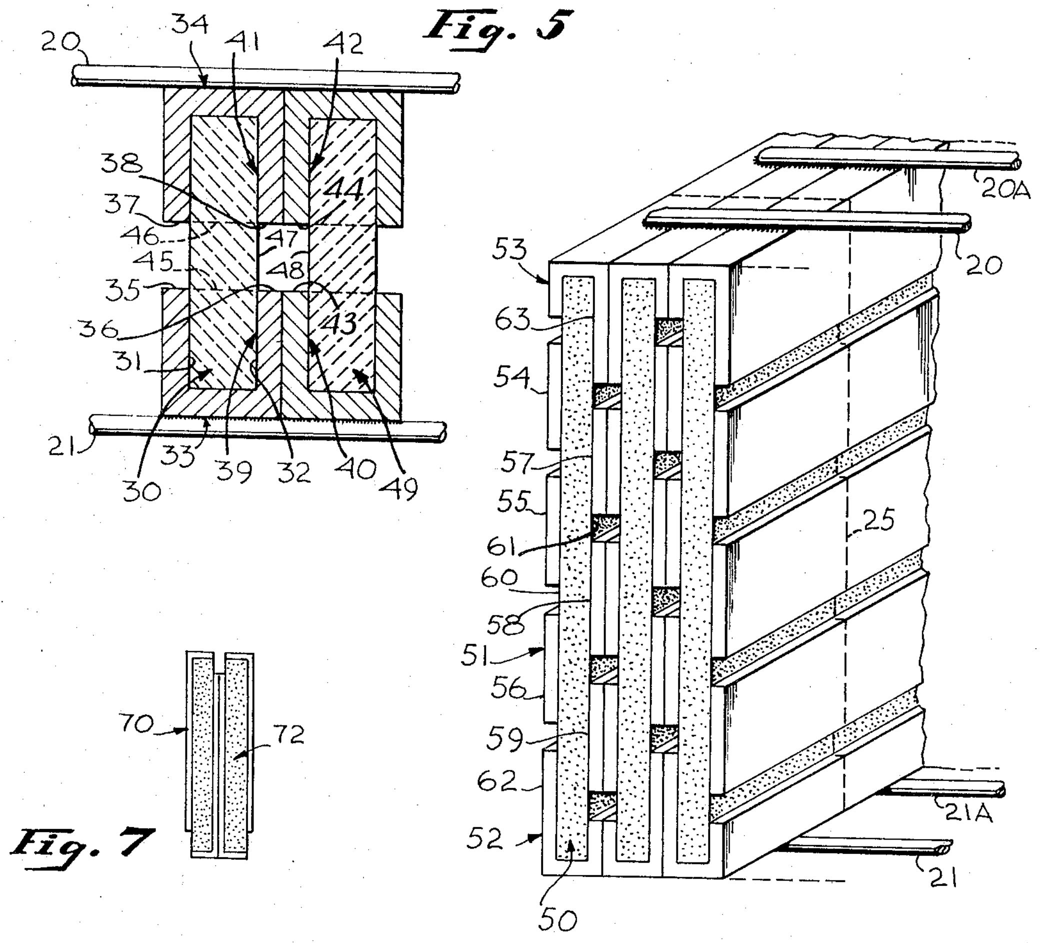
FIGURE 5 is a fragmentary sectional view of a capacitor having plate portions of another type of configuration in accordance with the present invention.
FIGURE 6 is a fragmentary, perspective, partially sectioned view of an assembled capacitor having still another form of plate configurations in accordance with the present invention.
FIGURES 7, 8 and 9 are fragmentary end views of assembled capacitors having additional forms and configurations of the plates.

Referring to FIGURE 5, there is seen a high voltage capacitor which utilizes a well known fringe effect for obtaining a quantity of capacitance which is not directly related to the usual plate-area factor involved in determining capacitance. Examining one of the modular portions for the moment, the entire capacitor being composed of a plurality of such modules in a parallel stacked relationship such as previously described, a rectanguloid body member 30 of dielectric material has parallel major surfaces 31 and 32 and is provided with U-shaped conductive plates 33 and 34 in opposed relationship, such plates being formed by the removal of corresponding portions of a thin conductive coating from the opposite surfaces 31 and 32 of the dielectric member 30. The end surfaces 35 and 36 of one plate 33 are coplanar and in spaced parallel opposition to the respective coplanar end surfaces 37 and 38 of the opposing plate 34. When the modules are stacked in the manner illustrated, and then fused or otherwise joined to each other so that the adjacent portions 39–40 and 41–42 of the plates present common opposed surfaces such as 36–43 and 38–44, such surfaces constitute the primary physical plates of the capacitor. When the dimensions of the elements are sufficiently small and of the proper relationship, the capacitance between the opposed end surfaces 35–37 and 36–38 is substantially the same as if the spacially separated end surfaces 35–36 and 37–38 of each individual plate 33 and 34, respectively, were joined by a common integral plate, as indicated by the dashed lines 45 and 46, respectively, which, it should be understood, are shown for purposes of explanation only and are not intended to represent any physical portion of the device. The fringe effect capacitance is prominent only with close spacings of the elements, i.e., the spacing between opposed plate ends and the width of the dielectric body member 30. Thus, for example, the dielectric body member 30 may have a width in the order of 0.001 inch, and the opposed plate ends 35–37, 36–38, and 43–44 may be separated by a distance in the same order of 0.001 inch. With a plate thickness of about 0.0004 inch, and a dielectric constant (K) for the dielectric member 30 of about 2000, the calculated capacity for one module, based only upon the areas of the end surfaces 35, 36, 37 and 38 of the plates 33 and 34, may be in the order of 1 mmfd. whereas, in fact, with the dimensions previously exampled, the capacitance of the device may be in the order of 500 mmfd. because of the increased capacitance effect due to the interacting fields. By stacking additional modules in the manner illustrated and described in connection with FIGURES 1 through 4, any desired capacitance may be attained. The terminal leads 20 and 21 may be attached in a manner similar to that previously described.

It is important to note that the special regions, such as defined by the opposed surface portions 47 and 48 of adjacent dielectric body members 30 and 49, respectively, and the opposed end surfaces 36, 43, 38 and 44 of the adjacent plates, is filled with a dielectric material such as, for example, Sylgard by a vacuum impregnation technique or any other process desired to assure total filling of any voids and spaces within the device with such dielectric material. For convenience and clarity of illustration, the fluid dielectric substance is not illustrated, except in FIGURE 4. Sylgard has the characteristics of being fluid and maintaining such fluidity over an indefinitely long period of time and, in addition, having even higher voltage breakdown and dielectric characteristics than presently known ceramics or other rigid materials utilizable as the dielectric body member. Thus, the device illustrated in FIGURE 5 is miniature in dimensions but attains the high voltage breakdown characteristic and high capacitance of a much larger capacitor and, furthermore, can be assembled, handled, measured, sliced and generally manufactured in accordance with the methods previously described.

Referring to FIGURE 6, there is seen a high voltage capacitor comprising a stacked plurality of individual modular capacitors, each of the modules being composed of a series of plates arranged in series-capacitance relationship to each other, with the successive modules arranged in parallel-capacitance relationship to each other. Examining one of the modules in detail, there is seen a dielectric body member 50, composed of a relatively rigid ceramic or plastic material, which is initially provided with a completely encompassing layer or film 51 of conductive material. Then, a previously-described process is used for removing selected portions of the conductive film 51 from the non-conductive body member 50 to constitute the remaining portions of the conductive film as plates of predetermined dimensions and relative locations with respect to each other in accordance with the capacitive effects desired and to be described hereinafter. In the embodiment illustrated in FIGURE 6, J-shaped plates 52 and 53 are disposed at opposite ends of the body member 50, and series of flat plates 54–55–56 and 57–58–59 are disposed on the parallel major surfaces 60 and 61, respectively, that such plates are in staggered relationship with respect to the corresponding plates on the opposite side. In the illustrated configuration, all of the flat plates 54 to 59 inclusive are identical to each other and, further, the long-arm portions 62 and 63 of the J-shaped plates 52 and 53, respectively, are identical to the flat plates, and the plates are symmetrically located with respect to each other so that opposing plates (including the long-arm plates of the J-shaped members) are in substantially half-lap coverage of each other. Thus, when a potential is applied between the two end plates 52 and 53, as by means of the corresponding terminals 20 and 21 secured thereto, such potential is divided into equal increments across each of the series of correspondingly opposed plates or plate portions. Of course, the areas of, and separations between, corresponding plates being identical, the capacitance of any one pair of opposing plates is identical with the capacitance between any other pair of opposing plates. Further, the current path being a series path, the total capacitance of any one module can be calculated in accordance with the well-known formula for series capacitors. Since the total applied potential across the module is divided between the series of capacitors, each module becomes an inherently high voltage capacitor. By stacking a plurality of modules in electrically parallel relationship, as illustrated, any amount of capacitance can be attained. Thus, a high-voltage, high-capacitance composite capacitor is derived. The fusing, impregnating and encapsulating techniques previously described in connection with the other embodiments of the present invention may be utilized for completing the processing of the device illustrated in FIGURE 6. Further, as indicated by the additional opposing terminals 20A and 21A and the slice-line 25, the composite capacitor may be sliced into lower capacitance units having the same high-voltage characteristics as the complete composite device illustrated or, for that matter, each of the modules.

Figure 8:
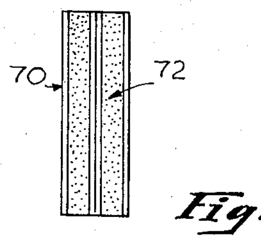
Figure 9:
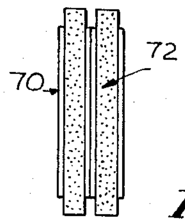

As seen in FIGURES 7, 8 and 9, other configurations of capacitors can be evolved utilizing the modular construction principles and the processes of the present invention wherein electrically conductive films 70 encompassing relatively rigid dielectric members 72 are etched, ground or otherwise removed from selected portions of a plurality of modules for selectively predetermined electrical as well as physical characteristics. Because of the unique locations of the plates of each module with respect to each other as well as to the corresponding plates of the successively stacked modules, the electrical terminals can be secured to the devices in a large number of convenient locations and relative dispositions with respect to any one or more of the dimensional axes of the device in accordance with the spatial and electrical requirements for usage of the device.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A method of making micro-miniature capacitors comprising: providing a plurality of identical capacitor modules, each having a thin rectangular high dielectric constant ceramic body member having a thickness of the order of 1 mil to 15 mils provided with thin conductive plates having a thickness of the order of 0.00001 inch to 0.0005 inch bonded thereon and covering opposed portions of major surfaces of said body member, stacking said modules with the plates of one module in registration with and surface contact with the corresponding plates of adjacent modules, fusing the contacting surfaces of said plates together by applying heat and pressure to said stacked modules to form a monolithic rectanguloid capacitor structure having uniform, fixed capacitance along the length thereof, and slicing said monolithic capacitor structure through said conductive plates in such a manner that said conducting layer will extend to said sliced edge to form a plurality of micro-miniature rectanguloid capacitors, each having conductive plates extending from sliced edge to sliced edge.

2. A method as recited in claim 1, further comprising the step of encapsulating said micro-miniature capacitors in a rigid resin to protect said capacitors from mechanical shock and strain.

3. A method of making micro-miniature capacitors comprising: providing a plurality of identical capacitor modules, each having a thin rectangular high dielectric constant ceramic body member having a thickness of the order of 1 mil to 15 mils provided with thin conductive plates having a thickness of the order of 0.00001 inch to 0.0005 inch bonded thereon and covering opposed portions of major surfaces of said body member, stacking said modules with the plates of one module in registration with and surface contact with the corresponding plates of adjacent modules, fusing the contacting surfaces of said plates together by applying heat and pressure to said stacked modules to form a monolithic rectanguloid capacitor structure having uniform, fixed capacitance along the length thereof, determining the capacitance of said monolithic capacitor structure, measuring along the length of said structure to locate points establishing lengths of said structure having predetermined capacitance values, and slicing said structure at said points to form a plurality of micro-miniature capacitors having said predetermined capacitance values.

4. A method as recited in claim 1, wherein said modules are made by bonding an electrically conductive thin film to said dielectric body member in completely surrounding relationship with respect to at least the length, width and two sides thereof and removing at least two selected parallel portions of said film from said member to form said plates.

5. A method as recited in claim 1, further comprising the step of attaching a pair of electrical terminal leads to said monolithic capacitor structure, each of said leads being connected to one plate of each of said modules.

6. A method of making micro-miniature capacitors comprising: providing a plurality of identical capacitor modules, each having a thin rectangular high dielectric constant ceramic body member having a thickness of the order of 1 mil to 15 mils provided with thin conductive plates having a thickness of the order of 0.00001 inch to 0.0005 inch bonded thereon and covering opposed portions of major surfaces of said body member, stacking said modules with the plates of one module in registration with and surface contact with the corresponding plates of adjacent modules, fusing the contacting surfaces of said plates together by applying heat and pressure to said stacked modules to form a monolithic rectanguloid capacitor structure having uniform, fixed capacitance along the length thereof, attaching pairs of electrical terminal leads at spaced points along the length of said monolithic capacitor structure, each lead of each pair of leads being connected to one plate of each of said modules, and slicing said monolithic capacitor structure at spaced points along the length thereof to sever micro-miniature capacitors therefrom, each having a pair of said leads thereon.

7. A method of making micro-miniature capacitor having a predetermined capacitance value comprising: forming a monolithic rectanguloid capacitor structure having a plurality of alternate ceramic dielectric and conducting layers extending the length of said structure, internal conducting layers being formed by fusing the contacting surfaces of adjacent contiguous conducting coatings bonded to said ceramic layers, said ceramic layers having a thickness of the order of 1 mil to 15 mils and said conducting coatings having a thickness of the order of 0.00001 inch to 0.0005 inch, said monolithic capacitor structure having uniform capacitance along the length thereof, determining the capacitance of said monolithic capacitor structure, measuring along the length of said monolithic capacitor structure to locate a point etsablishing a length of said monolithic capacitor structure having a capacitance equal to said predetermined capacitance value, and slicing said monolithic capacitor structure through said conducting layers at said point, in such a manner that said conducting layer will extend to said sliced edge.

8. A method as recited in claim 3, wherein said capacitance of said monolithic capacitor structure is determined by measuring said capacitance.

9. A method as recited in claim 3, wherein said capacitance of said monolithic capacitor structure is determined from the physical parameters of said monolithic capacitor structure.

10. A capacitor comprising: a rectanguloid rigid dielectric body member having two parallel surfaces of relatively major areas; and a pair of U-shaped conductive plates bonded to said body member in opposed relationship, each of said plates having a pair of parallel arm portions disposed on said surfaces and having ends terminating in a plane, such planes being in parallel and spatially opposed, whereby the capacitive effect is exhibited primarily between such opposed ends.

11. A capacitor in accordance with claim 10 in which said parallel planes are spaced a distance substantially equal to the distance between said parallel surfaces.

12. A capacitor in accordance with claim 11 in which said distance is in the order of 0.001 inch.

References Cited by the Examiner

UNITED STATES PATENTS

| | | | |
|---|---|---|---|
| 2,389,420 | 11/1945 | Deyrup | 29—25 X |
| 2,437,212 | 3/1948 | Schottland | 317—261 |
| 2,841,508 | 7/1958 | Roup | 317—258 X |
| 2,993,266 | 7/1961 | Berry. | |
| 3,192,086 | 6/1965 | Gyurk | 156—89 |
| 3,229,173 | 1/1966 | McHugh | 317—261 X |

FOREIGN PATENTS

| | | |
|---|---|---|
| 1,057,097 | 10/1953 | France. |
| 1,172,425 | 10/1958 | France. |
| 579,576 | 9/1946 | Great Britain. |
| 667,532 | 3/1952 | Great Britain. |
| 684,443 | 12/1952 | Great Britain. |

LEWIS H. MYERS, *Primary Examiner.*

E. GOLDBERG, *Assistant Examiner.*